(12) United States Patent
Oda et al.

(10) Patent No.: US 12,093,025 B2
(45) Date of Patent: Sep. 17, 2024

(54) CONVEYANCE SYSTEM, CONVEYANCE METHOD, AND COMPUTER READABLE MEDIUM

(71) Applicant: TOYOTA JIDOSHA KABUSHIKI KAISHA, Toyota (JP)

(72) Inventors: Shiro Oda, Anjo (JP); Tetsuya Taira, Nagakute (JP); Satoshi Toyoshima, Okazaki (JP); Yuta Watanabe, Toyota (JP); Takeshi Matsui, Nisshin (JP); Takayoshi Nasu, Okazaki (JP); Kei Yoshikawa, Nagoya (JP); Yusuke Ota, Nagakute (JP); Yutaro Ishida, Toyota (JP); Yuji Onuma, Nagoya (JP); Kyosuke Arai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 292 days.

(21) Appl. No.: 17/545,300

(22) Filed: Dec. 8, 2021

(65) Prior Publication Data
US 2022/0258349 A1    Aug. 18, 2022

(30) Foreign Application Priority Data
Feb. 17, 2021   (JP) .................................. 2021-023168

(51) Int. Cl.
*G05B 19/418*   (2006.01)
*G06F 9/4401*   (2018.01)

(52) U.S. Cl.
CPC ..... *G05B 19/41895* (2013.01); *G06F 9/4401* (2013.01)

(58) Field of Classification Search
CPC ...... B25J 9/1676; B25J 9/1661; B25J 11/008; G06F 9/4401; G05B 2219/40411; G05D 1/0276
See application file for complete search history.

(56) References Cited

U.S. PATENT DOCUMENTS

| | | | |
|---|---|---|---|
| 5,091,855 A * | 2/1992 | Umehara ............. | G05D 1/0265 701/23 |
| 2014/0343717 A1* | 11/2014 | Dorval ................. | G05D 1/0297 700/217 |

(Continued)

FOREIGN PATENT DOCUMENTS

| JP | S5447288 A | 4/1979 |
|---|---|---|
| JP | 58-186578 A | 10/1983 |

(Continued)

*Primary Examiner* — Khoi H Tran
*Assistant Examiner* — Dairon Estevez
(74) *Attorney, Agent, or Firm* — Dickinson Wright, PLLC

(57) ABSTRACT

In a conveyance system, a conveyance object is conveyed by use of a plurality of mobile robots autonomously movable inside a facility. In a case where a blockade request event occurs in at least one area inside the facility, the conveyance system receives occurrence information transmitted from a facility management system configured to manage the facility and causes the mobile robots to execute an operation restriction to restrict operations of the mobile robots. In a case where a predetermined condition for the blockade request event is established after the mobile robots execute the operation restriction, the conveyance system reboots the mobile robots.

21 Claims, 9 Drawing Sheets

(56) References Cited

U.S. PATENT DOCUMENTS

| | | | |
|---|---|---|---|
| 2019/0176323 A1* | 6/2019 | Coady | B65G 1/0421 |
| 2019/0381342 A1 | 12/2019 | Takagawa et al. | |
| 2020/0159249 A1* | 5/2020 | Mithal | B65G 43/10 |
| 2021/0162604 A1* | 6/2021 | Kim | B25J 9/1661 |
| 2021/0223779 A1* | 7/2021 | Passot | G01C 21/20 |

FOREIGN PATENT DOCUMENTS

| | | | | |
|---|---|---|---|---|
| JP | H1185281 A | | 3/1999 | |
| JP | 2009294832 A | * | 12/2009 | |
| JP | 2009294832 A | | 12/2009 | |
| JP | 2018122400 A | * | 8/2018 | B25J 19/021 |
| JP | 2018197731 A | * | 12/2018 | |
| JP | 2018197731 A | | 12/2018 | |
| JP | 2019012312 A | | 1/2019 | |
| JP | 2019215734 A | | 12/2019 | |
| KR | 101802612 B1 | * | 11/2017 | |

* cited by examiner

FIG. 8

| MOBILE ROBOT ID | PRIORITY LEVEL |
|---|---|
| R1 | 10 (MAXIMUM VALUE) |
| R2 | 4 |
| R3 | 1 (MINIMUM VALUE) |
| R4 | 7 |
| ⋮ | ⋮ |

FIG. 9

| OPERATION NECESSITY LEVEL | PRIORITY CHANGE VALUE |
|---|---|
| 5 (NECESSITY: HIGH) | -2 |
| 4 | -1 |
| 3 | ±0 |
| 2 | +1 |
| 1 (NECESSITY: LOW) | +2 |

CONVEYANCE SYSTEM, CONVEYANCE METHOD, AND COMPUTER READABLE MEDIUM

CROSS-REFERENCE TO RELATED APPLICATION

This application claims priority to Japanese Patent Application No. 2021-023168 filed on Feb. 17, 2021, incorporated herein by reference in its entirety.

BACKGROUND

1. Technical Field

This disclosure relates to a conveyance system, a conveyance method, and a computer readable medium.

2. Description of Related Art

Japanese Unexamined Patent Application Publication No. 2009-294832 (JP 2009-294832 A) describes a conveyance traveling vehicle system in which, upon receipt of an earthquake early warning, a conveyance traveling vehicle is stopped at a position deviating from a passage through which people pass.

SUMMARY

However, in the system described in JP 2009-294832 A, after the conveyance traveling vehicle is stopped, the conveyance traveling vehicle can be operated continuously depending on the degree of an earthquake or a fire. In view of this, there is still room for improvement in a subsequent operation.

This disclosure has been accomplished in order to solve such a problem. An object of this disclosure is to provide a conveyance system, a conveyance method, and a computer readable medium in each of which, in a case where the operation of a mobile robot conveying a conveyance object is restricted due to occurrence of a blockade request event in a facility, the conveyance of the conveyance object can be restarted immediately in response to cancellation of the event.

A conveyance system according to a first aspect of this disclosure is a conveyance system in which a conveyance object is conveyed by use of a plurality of mobile robots autonomously movable inside a facility. In a case where a blockade request event occurs in at least one area inside the facility, the conveyance system receives occurrence information transmitted from a facility management system configured to manage the facility and causes the mobile robots to execute an operation restriction to restrict operations of the mobile robots. In a case where a predetermined condition for the blockade request event is established after the mobile robots execute the operation restriction, the conveyance system reboots the mobile robots. With such configuration, in a case where the blockade request event occurs in the facility, and the operations of the mobile robots conveying conveyance objects are restricted, the conveyance system can immediately restart the conveyance of the conveyance objects in response to cancellation of the event.

A conveyance method according to a second aspect of this disclosure is a conveyance method for conveying a conveyance object by use of a plurality of mobile robots autonomously movable inside a facility. The conveyance method includes: in a case where a blockade request event occurs in at least one area inside the facility, receiving occurrence information transmitted from a facility management system configured to manage the facility and causing the mobile robots to execute an operation restriction to restrict operations of the mobile robots; and in a case where a predetermined condition for the blockade request event is established after the mobile robots execute the operation restriction, rebooting the mobile robots. With such a process, in a case where the blockade request event occurs in the facility, and the operations of the mobile robots conveying conveyance objects are restricted, the conveyance method can immediately restart the conveyance of the conveyance objects in response to cancellation of the event.

A program according to a third aspect of this disclosure is a computer readable medium storing a program causing a computer to execute a conveyance management in which a conveyance object is conveyed by use of a plurality of mobile robots autonomously movable inside a facility. The conveyance management is performed as follows: in a case where a blockade request event occurs in at least one area in the facility, the computer receives occurrence information transmitted from a facility management system configured to manage the facility and causes the mobile robots to execute an operation restriction to restrict operations of the mobile robots; and in a case where a predetermined condition for the blockade request event is established after the mobile robots execute the operation restriction, the computer reboots the mobile robots. With such a process, in a case where the blockade request event occurs in the facility, and the operations of the mobile robots conveying conveyance objects are restricted, the computer readable medium can immediately restart the conveyance of the conveyance objects in response to cancellation of the event.

Any of the first, second, and third aspects of this disclosure can employ the following configurations.

In a case where the mobile robots receive a restriction instruction, the mobile robots may notify information to an external device communicable with the mobile robots and then execute the operation restriction. In a case where the restrictions are cancelled by rebooting the mobile robots, the mobile robots ay acquire the information from the external device. Hereby, in a case where the operation restriction is cancelled by rebooting the mobile robots, the mobile robots can secure necessary information.

The operation restriction executed by the mobile robots may include a restriction to uniformly prohibit movements of the mobile robots. Hereby, in a case where the blockade request event occurs in the facility, it is possible to stop all the mobile robots, thereby allowing people to move safely inside the facility.

The operation restriction executed by the mobile robots may include a restriction to uniformly prohibit the mobile robots from entering a particular area. Hereby, in a case where the blockade request event occurs in the facility, the particular area can be secured, so that the particular area can be used variously.

In a case where the facility is a hospital and the blockade request event is an event of receiving an emergency call, the particular area may be an area where a blockade request is made in response to the emergency call thus received. Hereby, in a case where an emergency call is issued in the hospital, it is possible to secure a particular area to be used in case of an emergency call.

Priority levels indicative of priorities to execute the operation restriction between the mobile robots may be set to the mobile robots. The priority levels of the mobile robots may be changed in accordance with operation necessity levels indicative of necessities to operate the mobile robots so that exchange of information by use of communication between the mobile robots is performed prior to the operation restriction. Hereby, in a case where the blockade request event occurs in the facility, a mobile robot that needs to be operated can secure necessary information in priority to other mobile robots.

In a case where the mobile robots receive a restriction instruction during execution of respective tasks, the mobile robots may determine, based on respective remaining tasks necessary to accomplish the respective tasks, whether or not the mobile robots complete the respective remaining tasks before execution of a restriction corresponding to the restriction instruction. The mobile robots may execute the restriction at respective timings based on respective determination results. Hereby, in a case where the blockade request event occurs in the facility, the mobile robots can be individually caused to execute the operation restriction in accordance with their remaining tasks.

The conveyance system may determine a panic degree inside the facility based on at least either one of captured image data and sound recording data acquired inside the facility. The conveyance system may determine a mobile robot to be restricted from among the mobile robots in accordance with the panic degree. Hereby, in a case where the blockade request event occurs in the facility, the mobile robots can be individually caused to execute the operation restriction in accordance with the panic degree inside the facility.

This disclosure can provide a conveyance system, a conveyance method, and a computer readable medium in each of which, in a case where the operation of a mobile robot conveying a conveyance object is restricted due to occurrence of a blockade request event in a facility, it is possible to restart the conveyance of the conveyance object immediately after the event is cancelled.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 8 is a view illustrating a setting example of priority levels of mobile robots to be used in the example of FIG. 7; and FIG. 9 is a view illustrating an example of changing of priority levels in accordance with operation necessity levels to be used in the example of FIG. 7.

DETAILED DESCRIPTION OF EMBODIMENTS

The following describes the present disclosure based on embodiments of the disclosure but are not intended to limit the disclosure according to Claims to the following embodiments. Further, all constituents described in the embodiments are not necessarily essential as the means for solving the problem of the disclosure.

Schematic Configuration

Figure 1:
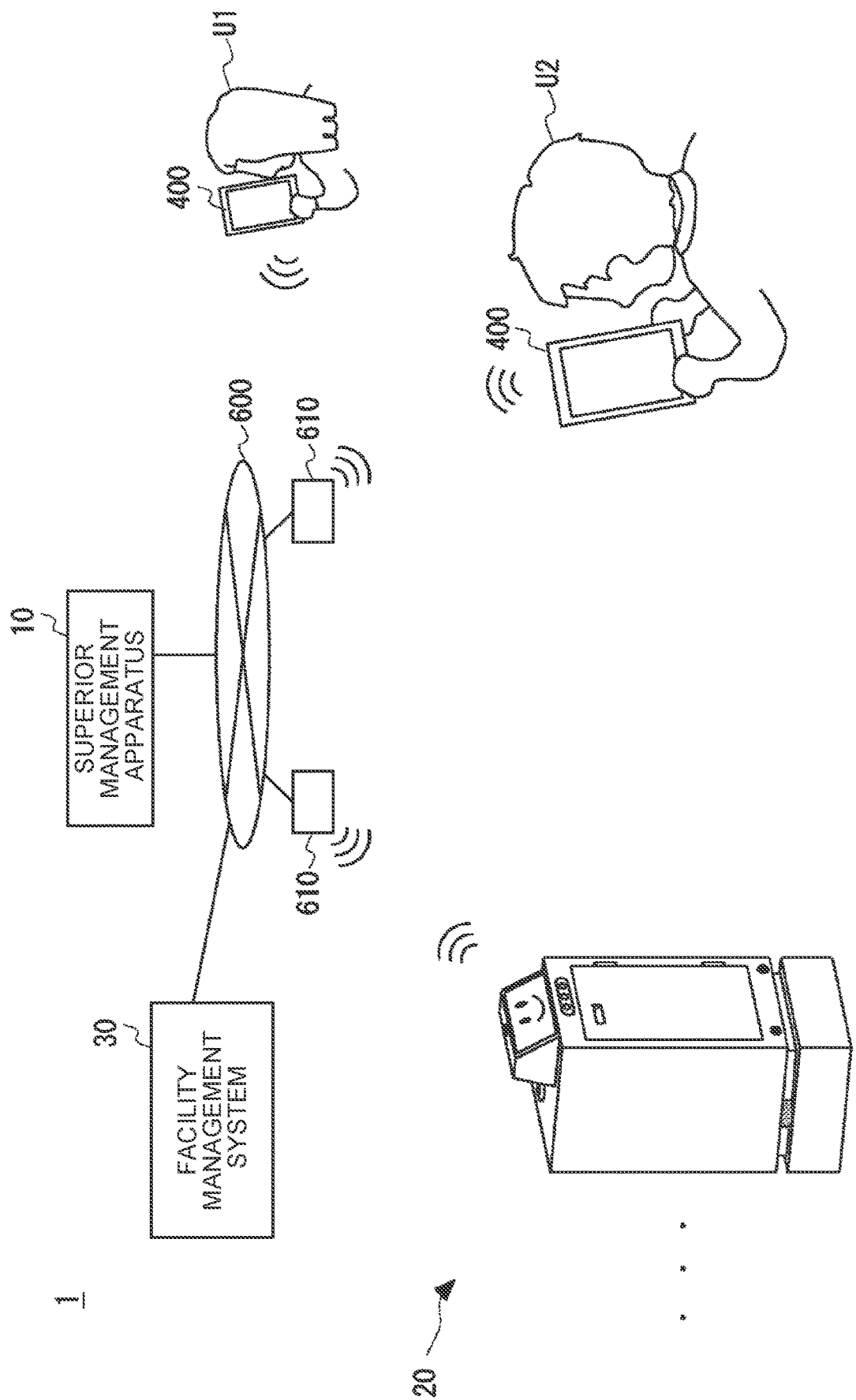
FIG. 1 is a schematic view to describe an exemplary overall configuration of a system according to a present embodiment in which a mobile robot is used.

FIG. 1 is a schematic view to describe an exemplary overall configuration of a conveyance system 1 according to the present embodiment in which a mobile robot 20 is used. The conveyance system 1 according to the present embodiment is a system in which a conveyance object is conveyed by use of a plurality of mobile robots that are autonomously movable in a facility. The following description deals with an example in which a mobile robot 20 illustrated in FIG. 1 is employed as the mobile robots. Note that the following description is made on the premise that one or more conveyance objects are conveyed solely by each of the mobile robots 20. However, the mobile robots 20 may convey one or more conveyance objects in collaboration with each other.

In addition to the mobile robots 20, the conveyance system 1 includes a superior management apparatus 10, a facility management system 30, a network 600, a communication unit 610, and user terminals 400.

The mobile robot 20 is a conveyance robot configured to execute conveyance of a conveyance object as a task. The mobile robot 20 autonomously travels to convey a conveyance object in a medical welfare facility such as a hospital, a rehabilitation center, a nursing facility, or a retirement home. Further, the conveyance system 1 according to the present embodiment is also usable in a facility (inside a building) such as a commercial facility like a shopping mall. Of course, the mobile robot 20 may be also autonomous movable outside the facility as well as inside the facility.

A user U1 such as a user or a usage assistant of a conveyance object or a manager of the conveyance object requests the mobile robot 20 to convey the conveyance object. At the time when the user U1 makes a conveyance request, the user U1 stores the conveyance object in the mobile robot 20 at a conveyance-requested place or a receipt destination (a conveyance source) included in information on the conveyance request. Of course, the conveyance object can be stored in the mobile robot 20 by use of a robot for storage or the like. Note that there is such a case where the conveyance object is conveyed such that the user U1 places the conveyance object on a mobile robot of another example (not illustrated) in a state where the conveyance object is exposed. However, for simplification of the description, the following description is made on the premise that the conveyance object is conveyed in a state where the conveyance object is stored in the mobile robot 20.

Examples of the conveyance object include a device targeted for rental (hereinafter referred to as a rental device), and the following description deals with the rental device as an example. However, the mobile robot 20 can also convey devices other than the rental device or conveyance objects other than the devices, e.g., medicines, consumables such as bandages, samples, hospital diet, and office equipment such as stationary products.

The user U1 can request conveyance of the rental device in accordance with a rental schedule of the rental device. The rental schedule can be managed by a device rental system (not illustrated) connected to the network 600. The rental schedule can be also referred to by the user U1 from the user terminal 400 so that the user U1 can make a conveyance request, and the rental schedule can be also referred to from the superior management apparatus 10.

The mobile robot 20 autonomously moves to a set destination and conveys the rental device. That is, the mobile robot 20 executes an object conveyance task (hereinafter just referred to as a task). In the following description, a place where the rental device is placed in the mobile robot 20 is referred to as a conveyance source, and a place to which the rental device is delivered is referred to as a conveyance destination.

For example, the mobile robot 20 moves inside a general hospital with a plurality of clinical departments. The mobile robot 20 conveys the rental device between the clinical departments. For example, the mobile robot 20 delivers the rental device from a nurse station of a given clinical department to a nurse station of another clinical department. Alternatively, the mobile robot 20 delivers the rental device from its storage room to a nurse station of a clinical department. Further, in a case where the conveyance destination is on a different floor, the mobile robot 20 may move by use of an elevator or the like.

Examples of the rental device include medical equipment such as an inspection appliance and a medical appliance. Examples of the medical equipment include a bedsore preventing device, a sphygmomanometer, a blood transfusion pump, intravenous equipment such as a syringe pump, a foot pump, a nurse call, a bed leaving sensor, a low-pressure continuous inhaler, an electrocardiogram monitor, a medicine injection controller, an enteral feeding pump, a ventilator, a cuff pressure meter, a touch sensor, an aspirator, a nebulizer, a pulse oximeter, a sphygmomanometer, a resuscitator, a clean bench, an echo machine, and so on. In addition to them, the medical equipment also includes various types of intravenous equipment, various types of vital monitors, and so on. Note that, as the blood transfusion pump, pumps of different flow rates may be also targeted for rental, for example. Thus, a plurality of machine types in each type of medical equipment may be also targeted for rental.

Further, some rental devices may be provided with a stand. Examples of the stand-equipped rental devices include a low-pressure continuous suction unit, an echo machine, an electrocardiogram monitor (a transmitter), an electrocardiogram monitor (a central monitor), an electrocardiogram monitor (a bedside monitor), a ventilator, a nebulizer, and so on. The stand-equipped rental devices are often operated by being connected to a commercial power supply instead of using a battery and are often kept in a rental storeroom as their storage place as compared with standless rental devices.

In the present embodiment, as illustrated in FIG. 1, the facility management system 30, the mobile robot 20, and the user terminal 400 are connected to the superior management apparatus 10 via the network 600. The mobile robot 20 and the user terminal 400 are connected to the network 600 via the communication unit 610. The network 600 is a wired or wireless local area network (LAN) and a wired or wireless wide area network (WAN). Further, the superior management apparatus 10 is connected to the network 600 in a wired or wireless manner. The communication unit 610 is, for example, a wireless LAN unit provided in each environment. The communication unit 610 may be a general-purpose communication device such as a Wi-Fi router, for example.

The superior management apparatus 10 is a server connected to each device and collects data from each device. Further, the superior management apparatus 10 is not limited to a physically single apparatus and may include a plurality of apparatuses configured to perform distributed processing. Further, the superior management apparatus 10 may be dispersedly placed in edge devices such as the mobile robot 20. For example, the conveyance system 1 may be partially or fully provided in the mobile robot 20.

The user terminal 400 may be, for example, a tablet computer, a smartphone, or the like and may be a stationary computer. The user terminal 400 should be an information processing device that is communicable in a wireless or wired manner.

A user U1 and a user U2 can make a conveyance request of a rental device by use of the user terminals 400. For example, the user U1 can refer to a schedule of the rental device to make the conveyance request by accessing the device rental system from the user terminal 400 (the user U1 may access the device rental system via the superior management apparatus 10). Then, the user U1 can make the conveyance request of the rental device to the superior management apparatus 10 based on the referred schedule. The conveyance request can be made by transmitting, to the superior management apparatus 10, conveyance request information including details of the rental device, a conveyance source, a conveyance destination, an estimated arrival time to the conveyance source (a rental device receipt time), an estimated arrival time to the conveyance destination (a conveyance time limit), and so on, for example. Note that loading of the rental device into the mobile robot 20 can be performed at a timing before or after transmission of the conveyance request from the user terminal 400, for example.

The superior management apparatus 10 that receives the conveyance request can make a conveyance request to the mobile robot 20. The superior management apparatus 10 is a management system configured to manage a plurality of mobile robots 20, and the superior management apparatus 10 transmits an operation command to execute a conveyance task to each mobile robot 20. At this time, every time the superior management apparatus 10 receives a conveyance request, the superior management apparatus 10 determines which mobile robot 20 executes a conveyance task corresponding to the conveyance request. The superior management apparatus 10 then transmits a control signal including an operation command to the mobile robot 20 thus determined. The mobile robot 20 moves from the conveyance source to reach the conveyance destination in accordance with the operation command.

For example, the superior management apparatus 10 assigns a conveyance task to a mobile robot 20 present in the conveyance source or in the vicinity of the conveyance source. Alternatively, the superior management apparatus 10 assigns a conveyance task to a mobile robot 20 directed to the conveyance source or the vicinity of the conveyance source. The mobile robot 20 to which the task is assigned goes to the conveyance source to receive the rental device. The conveyance source is, for example, a storage place of the rental device or a place where the user U1 making the conveyance request is present.

When the mobile robot 20 arrives at the conveyance source, the user U1 or a staff other than the user U1 places the rental device in the mobile robot 20. The mobile robot 20 in which the rental device is placed autonomously moves to the conveyance destination as a destination. The superior management apparatus 10 transmits a signal to the user terminal 400 of the user U2 present in the conveyance destination. Hereby, the user U2 can be notified that the rental device is under conveyance or can be notified of an estimated arrival time of the rental device. When the mobile robot 20 arrives at the set conveyance destination, the user U2 can receive the rental device accommodated in the mobile robot 20. The mobile robot 20 executes the conveyance task as such.

As described above, various signals sent from the user terminals 400 of the users U1, U2 can be once transmitted to the superior management apparatus 10 via the network 600 and then transferred to the mobile robot 20 as a target from the superior management apparatus 10. Similarly, various signals sent from the mobile robot 20 is once transmitted to the superior management apparatus 10 via the network 600 and then transferred to the user terminal 400 as a target from the superior management apparatus 10.

The user terminal 400 and the mobile robot 20 may exchange signals with each other without the superior management apparatus 10. For example, the user terminal 400 and the mobile robot 20 may directly exchange signals with each other via wireless communication. Alternatively, the user terminal 400 and the mobile robot 20 may exchange signals with each other via the communication unit 610.

The facility management system 30 is a system configured to manage a facility. For example, the facility management system 30 can manage lighting devices, air conditioners, and so on in each area or the like inside the facility. Further, the present embodiment has a main feature in a process to be performed in a case where a blockade request event such as fire alarming occurs. The blockade required even is an event in which the facility is required to be fully or partially blocked.

On this account, the facility management system 30 has a function to detect a blockade request event and notify it to the superior management apparatus 10. Accordingly, the facility management system 30 can be a server having such a function and connected to the superior management apparatus 10 so that the facility management system 30 can exchange data with the superior management apparatus 10. Hereby, the superior management apparatus 10 can receive the notification of the blockade request event sent from the facility management system 30, and further, the superior management apparatus 10 can acquire information (facility information and so on) on the facility controlled by the facility management system 30. The blockade request event and a process to be performed in a case where the blockade request event is detected are main features in the present embodiment and will be described later.

Some functions of the facility management system 30 may be dispersedly placed in the superior management apparatus 10, or the facility management system 30 may be incorporated in the superior management apparatus 10. Some functions of the facility management system 30 may be dispersedly placed in edge devices such as the mobile robot 20.

Control Block Diagram

Figure 2:
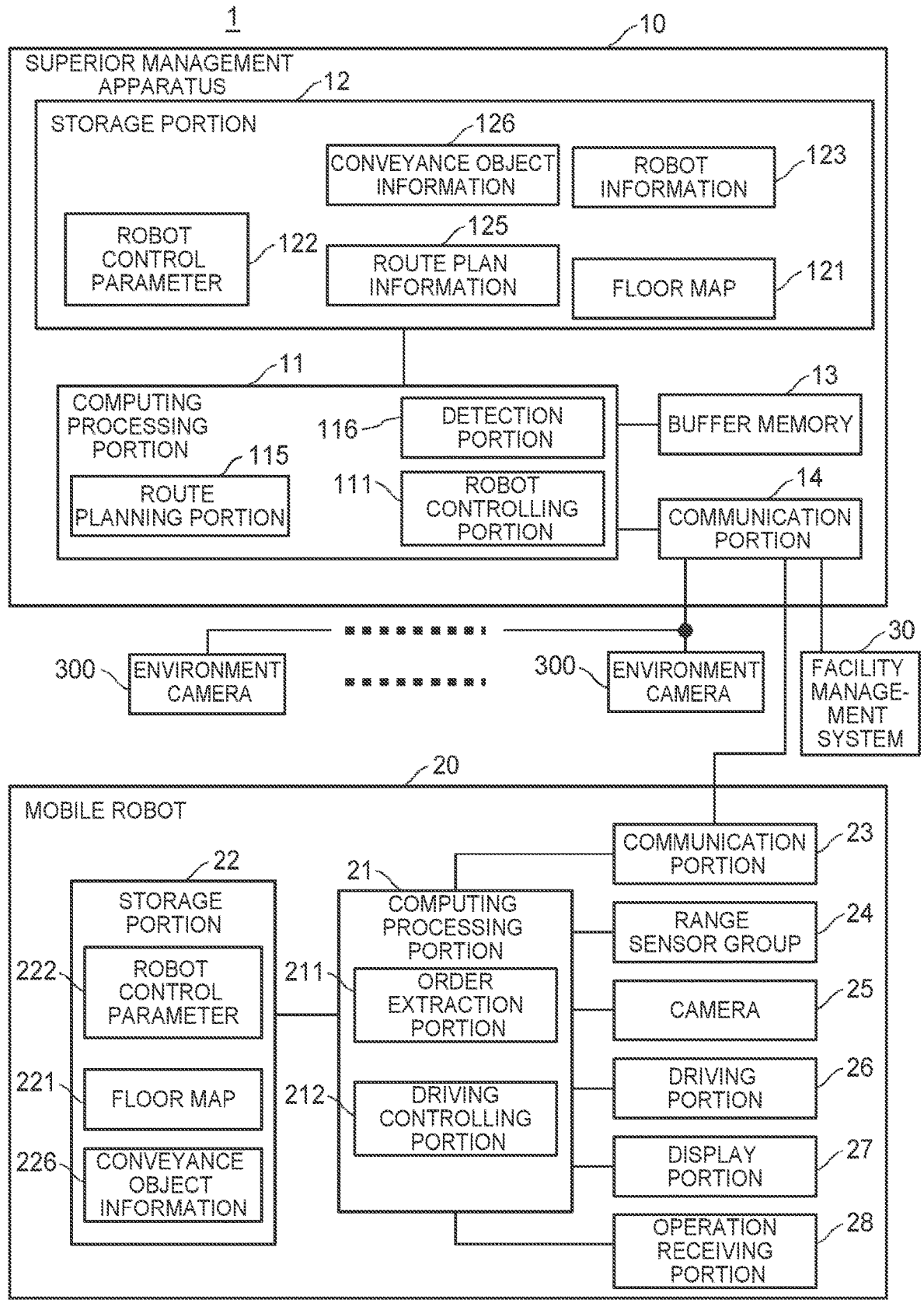
FIG. 2 is a control block diagram illustrating an example of a conveyance system according to the present embodiment.
Figure 3:
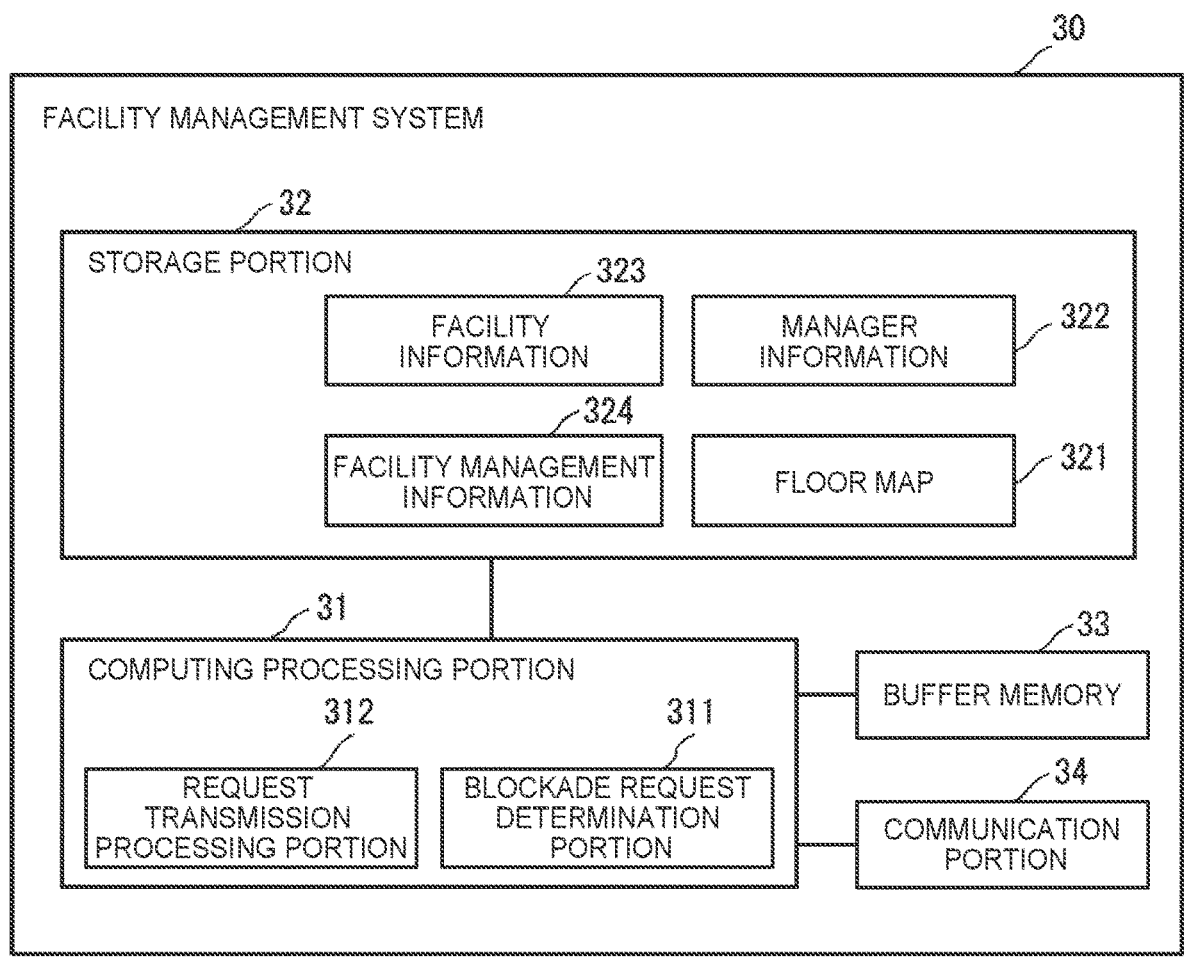
FIG. 3 is a control block diagram illustrating an example of a facility management system.

FIG. 2 is a control block diagram illustrating an example of a control system of the conveyance system 1. FIG. 3 is a control block diagram illustrating an example of the facility management system 30 in the conveyance system 1 in FIGS. 1, 2. As illustrated in FIG. 2, the conveyance system 1 can include the superior management apparatus 10, the mobile robots 20, the facility management system 30, and a plurality of environment cameras 300.

The conveyance system 1 efficiently controls the mobile robots 20 while the conveyance system 1 autonomously moves the mobile robots 20 in a predetermined facility. On this account, the environment cameras 300 are provided in the facility. For example, the environment cameras 300 are provided in passages, halls, elevators, an entrance, and so on in the facility.

The environment cameras 300 acquire images in a range where the mobile robots 20 move. Note that, in the conveyance system 1, the images acquired by the environment cameras 300 and information based on the images are collected by the superior management apparatus 10. Alternatively, the images or the like acquired by the environment cameras 300 may be transmitted directly to the mobile robots. The environment cameras 300 may be surveillance cameras or the like provided in the passages or the entrance in the facility. The environment cameras 300 may be used to find distribution of a congestion state in the facility.

The present embodiment deals with an example in which the environment cameras 300 are directly connected to the superior management apparatus 10. However, such a configuration can be also employed that the environment cameras 300 are targeted for management by the facility management system 30, and the superior management apparatus 10 receives data obtained by the environment cameras 300 via the facility management system 30.

In the conveyance system 1, the superior management apparatus 10 makes a route plan based on conveyance request information and generates route plan information. The route plan information can be generated as information indicative of a planned conveyance route corresponding to the rental schedule as described above. The superior management apparatus 10 instructs a destination to the mobile robot 20 based on the route plan information thus generated. The mobile robot 20 autonomously moves toward the destination designated by the superior management apparatus 10. The mobile robot 20 autonomously moves toward the destination by use of a sensor provided in the mobile robot 20, a floor map, position information, and so on.

For example, the mobile robot 20 travels so as not to come into contact with devices, objects, walls, and people around the mobile robot 20 (hereinafter, they are collectively referred to as a neighboring object). More specifically, the mobile robot 20 detects a distance to the neighboring object and travels in a state where the mobile robot 20 is apart from the neighboring object by a given distance (referred to as a distance threshold). When the distance to the neighboring object is equal to or less than the distance threshold, the mobile robot 20 slows down or stops. This allows the mobile robot 20 to travel without making contact with the neighboring object. Thus, the mobile robot 20 can avoid making contact with the neighboring object, thereby making it possible to achieve safe and efficient conveyance.

Further, the superior management apparatus 10 can transmit a restriction instruction (a restriction order) to cause the mobile robot 20 to restrict its operation, and the mobile robot 20 that receives the restriction instruction can restrict its own operation based on the restriction instruction. The superior management apparatus 10 can transmit a restriction instruction to a mobile robot 20 that does not operate, so that the mobile robot 20 that does not operate can keep an unoperated state in accordance with the restriction instruction.

This restriction can be performed as follows. That is, in a case where a blockade request event occurs, occurrence information indicative of the blockade request event is transmitted from the facility management system 30, and when the superior management apparatus 10 receives the occurrence information, the restriction is performed. The following deals with an example in which mainly the superior management apparatus 10 transmits an operation instruction to the mobile robots 20. However, such a configuration can be also employed that the mobile robots 20 receive occurrence information from the facility management system 30, and the mobile robots 20 execute a restriction in response to that. Examples of details of the blockade request event and the operation restriction will be described later.

The superior management apparatus 10 can include a computing processing portion 11, a storage portion 12, a buffer memory 13, and a communication portion 14. The computing processing portion 11 performs computing to control and manage the mobile robots 20. The computing processing portion 11 can be provided as a device that can execute programs, e.g., a central processing unit (CPU) of a computer. Various functions can be also implemented by programs. In FIG. 2, only a robot controlling portion 111, a route planning portion 115, and a detection portion 116 that are characteristic portions in the computing processing portion 11 are illustrated, but the computing processing portion 11 can also include other process blocks.

The robot controlling portion 111 performs computing to remotely control the mobile robots 20 and generates a control signal. The robot controlling portion 111 generates the control signal based on route plan information 125 (described later) and so on. Further, the robot controlling portion 111 generates the control signal based on various pieces of information acquired from the environment cameras 300 and the mobile robots 20. The control signal may include update information of a floor map 121, robot information 123, a robot control parameter 122, and so on (described later). That is, when various pieces of information are updated, the robot controlling portion 111 generates a control signal corresponding to update information on them. The update information may be the aforementioned occurrence information, and in this case, a restriction signal to restrict an operation is generated as the control signal.

The route planning portion 115 makes a route plan for each mobile robot 20. When a new conveyance task to convey a rental device is input, the route planning portion 115 makes a route plan to convey the rental device to its conveyance destination (destination), based on conveyance request information. More specifically, the route planning portion 115 refers to the route plan information 125, the robot information 123, and so on already stored in the storage portion 12 and determines a mobile robot 20 to be used to execute the new conveyance task. A departure place is a current position of the mobile robot 20, a conveyance destination of a previous conveyance task, a receipt destination of the rental device, or the like. The destination is a conveyance destination of the rental device but may be a standby place, a charging place, or the like.

Herein, the route planning portion 115 sets pass points from the departure place of the mobile robot 20 to the destination. The route planning portion 115 sets a passing order of the pass points for each mobile robot 20. The pass points are set at a branch point, an intersection, an area in front of an elevator, and places around them. Further, in a case of a narrow passage, it may be difficult for the mobile robots 20 to pass each other. In such a case, an area just in front of the narrow passage may be set as a pass point. Possible pass points may be registered in the floor map 121 in advance.

The route planning portion 115 determines a mobile robot 20 to be used to perform each conveyance task from among the mobile robots 20 so that tasks can be executed efficiently as the whole system. The route planning portion 115 preferentially assigns a conveyance task to a mobile robot 20 in a standby mode or a mobile robot 20 in the vicinity of the conveyance source of the conveyance task.

The route planning portion 115 sets pass points including a departure place and a destination to the mobile robot 20 to which the conveyance task is assigned. For example, in a case where there are two or more travel routes from the conveyance source to the conveyance destination, the pass points are set so that the mobile robot 20 can move in a shorter time. For this purpose, the superior management apparatus 10 updates information indicative of congestion states of passages based on images from the cameras or the like. More specifically, a place where other mobile robots 20 pass or a place with many people have a high congestion degree. Accordingly, the route planning portion 115 sets the pass points to avoid a place with a high congestion degree.

In some cases, the mobile robot 20 can move to the destination via either a counterclockwise travel route or a clockwise travel route. In such cases, the route planning portion 115 sets the pass points so that the mobile robot 20 passes through a travel route that is not crowded. When the route planning portion 115 sets one or more pass points to the destination, the mobile robot 20 can move along a travel route that is not crowded. In a case where the passage is divided at a branch point or an intersection, for example, the route planning portion 115 sets the pass points appropriately at the branch point, the intersection, a corner, and a neighboring area thereof. This makes it possible to improve conveyance efficiency.

The route planning portion 115 may set the pass points in consideration of a congestion state of an elevator, a moving distance, and the like. Further, the superior management apparatus 10 may estimate the number of the mobile robots 20 or the number of people in an estimated time when the mobile robot 20 passes through a given place. The route planning portion 115 may set the pass points based on an estimated congestion state. Further, the route planning portion 115 may dynamically change the pass points in accordance with the congestion state. The route planning portion 115 sets the pass points in order for the mobile robot 20 to which the conveyance task is assigned. The pass points may include the conveyance source or the conveyance destination. As will be described later, the mobile robot 20 autonomously moves to sequentially pass through the pass points set by the route planning portion 115.

The detection portion 116 detects occurrence information transmitted from the facility management system 30 and received by the communication portion 14. The occurrence information is a notification to inform occurrence of a blockade request event. In a case where the detection portion 116 detects such a notification, the robot controlling portion 111 transmits a control signal to the mobile robot 20 via the communication portion 14, the control signal including a restriction instruction (a restriction order) to cause the mobile robot 20 to execute an operation restriction. Further, before the robot controlling portion 111 transmits the control signal including the restriction instruction, the robot controlling portion 111 should save a transmission history of the restriction instruction at the stage where the detection portion 116 detects the occurrence information or just after the robot controlling portion 111 transmits the control signal. The robot controlling portion 111 can be configured to transmit, to the mobile robot 20, an instruction to cancel the restriction. In that case, the robot controlling portion 111 can instruct the cancellation by referring to the transmission history. The instruction of cancellation is one feature of the present embodiment and can be an instruction to reboot the mobile robot 20. The instruction can be transmitted to the mobile robot 20 such that the instruction is included in the control signal.

The storage portion 12 is a storage portion in which information necessary for management and control of the robots is stored. In the example of FIG. 2, the floor map 121, the robot information 123, the robot control parameter 122, the route plan information 125, and conveyance object information 126 are illustrated, but information stored in the storage portion 12 may be information other than them and may include the transmission history. The computing processing portion 11 performs computing by use of the information stored in the storage portion 12 at the time when the computing processing portion 11 performs various processes. Further, various pieces of information stored in the storage portion 12 can be updated to latest information.

The floor map 121 is map information of the facility in which the mobile robots 20 move. The floor map 121 may be formed in advance, may be generated from information acquired from the mobile robots 20, or may be formed by adding map correction information generated from information acquired from the mobile robots 20 to a basic map formed in advance.

As for the robot information 123, an ID, a model number, a specification, and so on of the mobile robot 20 managed by the superior management apparatus 10 are described. The robot information 123 may include position information indicative of a current position of the mobile robot 20. The robot information 123 may also include information indicating whether the mobile robot 20 is executing a task or is in a standby mode. Further, it is desirable that the robot information 123 include information indicating that the mobile robot 20 is during normal operation (in operation), under a restriction, out-of-order, or the like. The robot information 123 can include information indicating that the mobile robot 20 is under a restriction as the transmission history at the time when the mobile robot 20 is restricted. Further, the robot information 123 may include information on a conveyable rental device or a non-conveyable rental device.

In the robot control parameter 122, a control parameter such as a threshold distance to a neighboring object from the mobile robot 20 managed by the superior management apparatus 10 is described. The threshold distance is a margin distance to avoid a contact with the neighboring object including people. Further, the robot control parameter 122 may include information on operation intensity such as a speed upper limit of the moving speed of the mobile robot 20.

The robot control parameter 122 may be updated in accordance with circumstances. The robot control parameter 122 may include information indicative of a vacancy state or a usage state of an accommodation space of a cabinet 291 (described later). The robot control parameter 122 may include information on a conveyable rental device or a non-conveyable rental device. Of course, the robot control parameter 122 can also include information indicative of whether a conveyance object other than the rental device is conveyable or not. In the robot control parameter 122, the aforementioned various pieces of information are associated with each other for each mobile robot 20.

The route plan information 125 includes route plan information planned by the route planning portion 115. The route plan information 125 includes information indicative of a conveyance task, for example. The route plan information 125 may include information on an ID of the mobile robot 20 to which the task is assigned, a departure place, details of a rental device, a conveyance destination, a conveyance source, an estimated arrival time to the conveyance destination, an estimated arrival time to the conveyance source, an arrival time limit, and so on. In the route plan information 125, the aforementioned various pieces of information are associated with each other for each conveyance task. The route plan information 125 may include at least part of conveyance request information input by the user U1.

Further, the route plan information 125 may include information on the pass points for each mobile robot 20 or each conveyance task. For example, the route plan information 125 may include information indicative of the passing order of the pass points for each mobile robot 20. The route plan information 125 may include information on coordinates of the pass points on the floor map 121 and information on whether or not each mobile robot 20 passes through the pass points.

The conveyance object information 126 is information on a rental device requested to be conveyed. For example, the conveyance object information 126 include information on details (type) of the rental device, a conveyance source, a conveyance destination, and so on. Of course, the conveyance object information 126 may include information on a conveyance object other than the rental device, and the same can be said about information other than the conveyance object information 126. The conveyance object information 126 may include the ID of a mobile robot 20 in charge of the conveyance. Further, the conveyance object information 126 may include information indicative of a status, e.g., during conveyance, before conveyance (before loading), conveyance completed, and so on. In the conveyance object information 126, these pieces of information are associated with each other for each rental device.

Note that the route planning portion 115 refers to various pieces of information stored in the storage portion 12 and makes a route plan. For example, the route planning portion 115 determines a mobile robot 20 to be used to execute the task, based on the floor map 121, the robot information 123, the robot control parameter 122, and the route plan information 125. Then, the route planning portion 115 sets pass points to the conveyance destination and a passing order of the pass points by referring to the floor map 121 and so on. Possible pass points are registered in the floor map 121 in advance. The route planning portion 115 sets the pass points in accordance with a congestion state or the like. Further, in a case where tasks are processed consecutively, the route planning portion 115 may set conveyance sources and conveyance destinations of the tasks as the pass points.

The buffer memory 13 is a memory in which intermediate information is stored, the intermediate information being generated in a process performed in the computing processing portion 11. The communication portion 14 is a communication interface to communicate with the facility management system 30, the environment cameras 300 provided in the facility where the conveyance system 1 is operated, and the mobile robots 20. The communication portion 14 can perform wired communication and wireless communication. For example, the communication portion 14 transmits, to each mobile robot 20, a control signal necessary for control of the each mobile robot 20. Further, the communication portion 14 receives information collected by the mobile robots 20 and the environment cameras 300. The communication portion 14 can receive various pieces of information such as occurrence information from the facility management system 30 and may transmit a request of these pieces of information to the facility management system 30.

The mobile robot 20 can include a computing processing portion 21, a storage portion 22, a communication portion 23, a proximity sensor (e.g., a range sensor group 24), cameras 25, a driving portion 26, a display portion 27 and an operation receiving portion 28. Note that FIG. 2 illustrates only representative process blocks provided in the mobile robot 20, but the mobile robot 20 also includes a lot of other process blocks (not illustrated).

The communication portion 23 can include a first communication interface via which the communication portion 23 communicates with the communication portion 14 of the superior management apparatus 10, and a second communication interface via which the communication portion 23 wirelessly communicates with the communication portions 23 of other mobile robots. The communication portion 23 communicates with the communication portion 14 by use of a radio signal, for example. The second communication interface should perform communication between mobile robots (hereinafter also referred to as "robot-to-robot communication") as described above, and short-distance wireless communication such as Bluetooth (registered trademark) can be used, for example. Information exchanged by the robot-to-robot communication can be position information on a host robot or other robots, status information on a battery capacity or the like, information (order or the like) transmitted from the superior management apparatus 10 to other robots, and so on.

The range sensor group 24 is, for example, a proximity sensor and outputs proximity object distance information indicative of a distance to an object or people present around the mobile robot 20. The camera 25 captures an image to grasp a surrounding state around the mobile robot 20, for example. Further, the camera 25 can capture an image of a position marker provided on the ceiling or the like of the facility, for example. The mobile robot 20 may grasp its own position by use of the position marker.

The driving portion 26 drives driving wheels provided in the mobile robot 20. Note that the driving portion 26 may include an encoder or the like configured to detect the rotation number of the driving wheels or a drive motor for the driving wheels. The own position (current position) of the mobile robot 20 may be estimated based on an output from the encoder. The mobile robot 20 detects its own current position and transmits it to the superior management apparatus 10.

The display portion 27 and the operation receiving portion 28 are implemented by a touch panel display. The display portion 27 displays a user interface screen serving as the operation receiving portion 28. Further, the display portion 27 may display information indicative of a destination of the mobile robot 20 or a state of the mobile robot 20. The operation receiving portion 28 receives an operation from a user. The operation receiving portion 28 includes various switches provided in the mobile robot 20 in addition to the user interface screen displayed on the display portion 27.

The computing processing portion 21 performs computing to control the mobile robot 20. The computing processing portion 21 can be implemented as a device that can execute programs, e.g., a central processing unit (CPU) of a computer. Various functions can be also implemented by programs. The computing processing portion 21 includes an order extraction portion 211 and a driving controlling portion 212. Note that, in FIG. 2, only representative process blocks provided in the computing processing portion 21 are illustrated, but the computing processing portion 21 includes process blocks that are not illustrated herein. The computing processing portion 21 may search a route between pass points.

The order extraction portion 211 extracts a movement order or a restriction order from a control signal given from the superior management apparatus 10. For example, the movement order includes information on a next pass point. The control signal about the movement order may include, for example, information on coordinates of the pass points or information on the passing order of the pass points. The order extraction portion 211 extracts these pieces of information as the movement order.

The movement order may further include information indicating that the mobile robot 20 is movable to the next pass point. In a case where a passage is narrow; the mobile robots 20 may not be able to pass each other. Further, the passage may be temporarily closed in some cases. In such cases, the control signal includes an order to stop the mobile robot 20 at a pass point just before a place where the mobile robot 20 should stop. After a counterpart mobile robot 20 has passed through the narrow passage or the passage closure is removed, the superior management apparatus 10 outputs, to the mobile robot 20, a control signal indicating that the mobile robot 20 can pass through the passage. In response to this, the mobile robot 20 that has temporarily stopped restarts moving.

The control signal on the restriction order (restriction instruction) includes information indicative of execution of an operation restriction, and the mobile robot 20 should execute a predetermined restriction in response to the control signal. However, the control signal may include information specifically indicative of what kind of restriction is executed. The restriction order can be the aforementioned order to stop the mobile robot 20. The order extraction portion 211 extracts these pieces of information as the restriction order.

The driving controlling portion 212 controls the driving portion 26 based on the movement order or the restriction order given from the order extraction portion 211 such that the mobile robot 20 moves or executes an operation restriction. For example, the driving portion 26 includes the driving wheels configured to rotate in response to a control command value from the driving controlling portion 212. The order extraction portion 211 extracts the movement order so that the mobile robot 20 moves toward a pass point received from the superior management apparatus 10. Then, the driving portion 26 drives the driving wheels to rotate. The mobile robot 20 autonomously moves toward a next pass point. As such, the mobile robot 20 sequentially passes through the pass points and arrives at the conveyance destination. Further, the mobile robot 20 may estimate its own position and transmit, to the superior management apparatus 10, a signal indicating that the mobile robot 20 has passed a pass point. Hereby, the superior management apparatus 10 can manage respective current positions or respective conveyance states of the mobile robots 20.

Further, the order extraction portion 211 extracts the restriction order from the control signal given from the superior management apparatus 10, and the driving portion 26 stops the driving wheels. Further, the restriction order can include an order to cause the mobile robot 20 to head to a particular area. In such a case, the driving portion 26 drives the driving wheels to rotate so that the mobile robot 20 heads to the area.

A floor map 221, a robot control parameter 222, and conveyance object information 226 are stored in the storage portion 22. In FIG. 2, only some of pieces of information stored in the storage portion 22 are illustrated. However, information other than the floor map 221, the robot control parameter 222, and the conveyance object information 226 illustrated in FIG. 2 is also included in the pieces of information stored in the storage portion 22. In a case where details of the operation restriction are determined in advance, for example, information indicative of the details can be also included in the pieces of information stored in the storage portion 22. The floor map 221 is map information of the facility in which the mobile robot 20 moves. The floor map 221 is data obtained by partially or fully downloading the floor map 121 of the superior management apparatus 10, for example. Note that the floor map 221 may be formed in advance. Further, the floor map 221 may be map information partially including a region where the mobile robot 20 is planned to move, instead of map information on the whole facility.

The robot control parameter 222 is a parameter to operate the mobile robot 20. The robot control parameter 222 includes, for example, a distance threshold for a distance to a neighboring object. Further, the robot control parameter 222 includes a speed upper limit of the mobile robot 20.

The conveyance object information 226 includes information on a rental device, similarly to the conveyance object information 126. The conveyance object information 226 can include information on details of the rental device (a type, i.e., a model of the rental device), a conveyance source, a conveyance destination, and so on. The conveyance object information 226 may include information indicative of a status, e.g., during conveyance, before conveyance (before loading), conveyance completed, and so on. In the conveyance object information 226, each rental device is associated with these pieces of information. The conveyance object information 226 should include information on the rental device to be conveyed by the mobile robot 20. Accordingly, the conveyance object information 226 is part of the conveyance object information 126. That is, the conveyance object information 226 may not include information on rental devices to be conveyed by other mobile robots 20.

The driving controlling portion 212 refers to the robot control parameter 222 and stops or slows down the operation of the mobile robot 20 when a distance indicated by distance information acquired from the range sensor group 24 goes below the distance threshold. The driving controlling portion 212 controls the driving portion 26 such that the mobile robot 20 travels at a speed equal to or less than the speed upper limit. The driving controlling portion 212 controls the rotation speed of the driving wheels so that the mobile robot 20 does not travel at a speed equal to or higher than the speed upper limit.

As illustrated in FIG. 3, the facility management system 30 can include a computing processing portion 31, a storage portion 32, a buffer memory 33, and a communication portion 34. The computing processing portion 31 performs computing to control equipment in the facility. The computing processing portion 31 can be implemented as a device that can execute programs, e.g., a central processing unit (CPU) of a computer. Various functions can be also implemented by programs. In FIG. 3, only a blockade request determination portion 311 and a request transmission processing portion 312 that are features of the computing processing portion 31 are illustrated, but the computing processing portion 31 can also include other process blocks.

The blockade request determination portion 311 determines whether or not the facility is in a state where a request (a facility blockade request) to blockade the facility should be issued, by referring to disaster information received from the communication portion 34 via the Internet or the like or facility management information 324 (described later) to manage various pieces of equipment in the facility.

In a case where the blockade request determination portion 311 determines that the facility is in a state where the facility blockade request should be issued, the request transmission processing portion 312 performs a process of transmitting occurrence information indicative of the determination result to the superior management apparatus 10. The occurrence information can be transmitted to the superior management apparatus 10 by the request transmission processing portion 312 controlling the communication portion 34. That is, the request transmission processing portion 312 transmits the occurrence information to the superior management apparatus 10 via the communication portion 34.

The storage portion 32 is a storage portion in which information necessary for control of the facility management system 30 is stored. In the example of FIG. 3, a floor map 321, manager information 322, facility information 323, and facility management information 324 are illustrated, but information other than them may be stored in the storage portion 32. The computing processing portion 31 performs computing by use of the information stored in the storage portion 32 at the time when the computing processing portion 31 performs various processes. Further, various pieces of information stored in the storage portion 32 can be updated to latest information.

The floor map 321 can be part of or all of the floor map 121. The facility information 323 is information indicative of an ID, a type, or the like of each equipment in the facility. The facility information 323 can include information indicative of an installation site of each equipment, and the information on the installation site can be associated with the floor map 321. The facility management information 324 includes information indicative of an operating status of each equipment indicated by the facility information 323, a value of a mounted sensor, or the like and can be updated at any time. For example, in a case where a fire detector is provided as a piece of equipment, when the fire detector detects a fire, information indicative of the occurrence of the fire is written in the facility management information 324. Further, in a case where the facility is a hospital, when an emergency call is issued, information on the emergency call (in a case where an area is designated, the information includes information indicative of the area) can be also written as part of the facility management information 324. The manager information 322 is information associated with each equipment indicated by the facility information 323. The manager information 322 can include information indicative of a manager of each equipment and information indicative of a notification destination for the manager.

The buffer memory 33 is a memory in which intermediate information is stored, the intermediate information being generated in a process to be performed in the computing processing portion 31. The communication portion 34 is a communication interface via which the facility management system 30 communicates with the superior management apparatus 10. The communication interface can be configured to communicate with the user terminal 400 or the mobile robot 20. The communication portion 34 can perform wired communication and wireless communication. For example, the communication portion 34 transmits information such as the occurrence information to the superior management apparatus 10, or the communication portion 34 can receive various pieces of information from the superior management apparatus 10 or the user terminal 400.

Configuration of Mobile Robot 20

Figure 4:
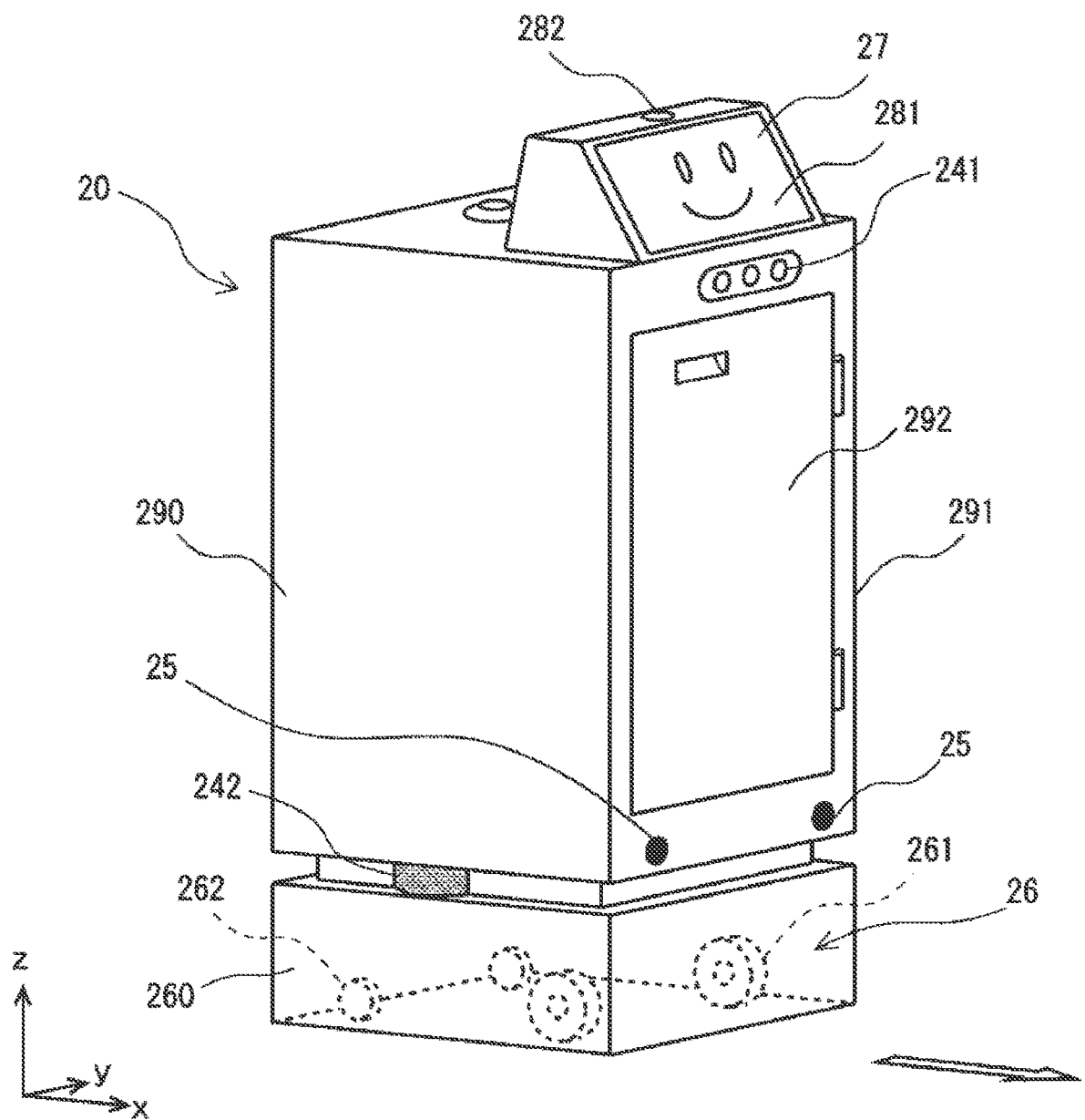
FIG. 4 is a schematic view illustrating an example of the mobile robot.

Here, the appearance of the mobile robot 20 will be described. FIG. 4 is a schematic view of the mobile robot 20. The mobile robot 20 illustrated in FIG. 4 is one form of the mobile robot 20 and may be configured in other forms. Note that, in FIG. 4, an x-direction is along the forward direction and the reverse direction of the mobile robot 20, a y-direction is along the right-left direction of the mobile robot 20, and a z-direction is along the height direction of the mobile robot 20.

The mobile robot 20 includes a main body portion 290 and a wagon portion 260. The main body portion 290 is provided on the wagon portion 260. The main body portion 290 and the wagon portion 260 include respective rectangular-solid shaped housings, and the constituents of the mobile robot 20 are provided inside the housings. For example, the driving portion 26 is accommodated inside the wagon portion 260.

The main body portion 290 is provided with a cabinet 291 serving as a housing space, and a door 292 configured to seal the cabinet 291. The cabinet 291 is provided with a plurality of shelves, and a vacancy state is managed per shelf. For example, when various sensors such as weight sensors are provided in respective shelves, the vacancy states of the respective shelves can be updated. The mobile robot 20 autonomously moves and conveys a rental device stored in the cabinet 291 to a destination designated by the superior management apparatus 10. The main body portion 290 may be equipped with a control box (not illustrated) or the like inside the housing. Further, the door 292 may be lockable by an electronic key or the like. When the mobile robot 20 arrives at the conveyance destination, the user U2 unlocks the door 292 by the electronic key. Alternatively, the door 292 may be automatically unlocked when the mobile robot 20 arrives at the conveyance destination.

As illustrated in FIG. 4, the outer face of the mobile robot 20 is provided with front-rear range sensors 241 and right-left range sensors 242 as the range sensor group 24. The mobile robot 20 measures a distance to a neighboring object present near the mobile robot 20 in its front-rear direction by the front-rear range sensors 241. Further, the mobile robot 20 measures a distance to a neighboring object present near the mobile robot 20 in its right-left direction by the right-left range sensors 242.

For example, the front-rear range sensors 241 are placed on a front face and a rear face of the housing of the main body portion 290, respectively. The right-left range sensors 242 are placed on a right-side face and a left-side face of the housing of the main body portion 290, respectively. The front-rear range sensors 241 and the right-left range sensors 242 are an ultrasonic distance sensor or a laser range finder, for example. The front-rear range sensors 241 and the right-left range sensors 242 detect a distance to a neighboring object. In a case where the distance to the neighboring object, detected by any of the front-rear range sensors 241 and the right-left range sensors 242, is equal to or less than the distance threshold, the mobile robot 20 slows down or stops.

The driving portion 26 is provided with driving wheels 261 and casters 262. The driving wheels 261 are wheels configured to move the mobile robot 20 in the front-rear direction and in the right-left direction. The casters 262 are follower wheels configured to roll by following the driving wheels 261, and no driving force is applied to the casters 262. The driving portion 26 includes a driving motor (not illustrated) and drives the driving wheels 261.

For example, inside the housing, the driving portion 26 supports two driving wheels 261 and two casters 262 each making contact with a travel road surface. The two driving wheels 261 are disposed such that their rotation axial centers coincide with each other. The driving wheels 261 are driven to rotate independently by a motor (not illustrated). The driving wheels 261 rotate in response to a control command value from the driving controlling portion 212 illustrated in FIG. 2. The casters 262 are follower wheels. Pivot shafts vertically extending from the driving portion 26 are provided away from the rotation axes of wheels of the casters 262 such that the pivot shafts rotatably support the wheels. The casters 262 follow the driving wheels 261 along the moving direction of the driving portion 26.

For example, when the two driving wheels 261 are rotated in the same direction at the same rotation speed, the mobile robot 20 moves straight, and when the two driving wheels 261 are rotated in reverse directions at the same rotation speed, the mobile robot 20 turns around the vertical axis passing through generally the center between the two driving wheels 261. Further, when the two driving wheels 261 are rotated in the same direction at different rotation speeds, the mobile robot 20 moves to turn right or left. For example, when the rotation speed of the left driving wheel 261 is made higher than the rotation speed of the right driving wheel 261, the mobile robot 20 can turn right. In the meantime, when the rotation speed of the right driving wheel 261 is made higher than the rotation speed of the left driving wheel 261, the mobile robot 20 can turn left. That is, when respective rotation directions and respective rotation speeds of the two driving wheels 261 are controlled individually, the mobile robot 20 can make a translational motion in a given direction, turn around, or turn right or left.

Further, the mobile robot 20 is provided with the display portion 27 and a manipulation interface 281 on the top surface of the main body portion 290. The manipulation interface 281 is displayed on the display portion 27. When a user performs a touch operation on the manipulation interface 281 displayed on the display portion 27, the operation receiving portion 28 can receive an instruction input from the user. Further, an emergency stop button 282 is provided on the top surface of the display portion 27. The emergency stop button 282 and the manipulation interface 281 function as the operation receiving portion 28.

The display portion 27 is a liquid crystal panel, for example. The display portion 27 displays an illustration of the face of a character or exhibits information on the mobile robot 20 with a text and an icon. When the face of the character is displayed on the display portion 27, an impression that the display portion 27 is like a dummy face can be given to an observer around the mobile robot 20. The display portion 27 or the like provided in the mobile robot 20 can be used as the user terminal 400.

The cameras 25 are provided on the front face of the main body portion 290. Herein, two cameras 25 function as a stereoscopic camera. That is, the two cameras 25 having the same angle of view are placed to be separated from each other in the horizontal direction. Respective images captured by the cameras 25 are output as image data. Based on the image data from the two cameras 25, the distance to a subject or the size of the subject can be calculated. The computing processing portion 21 can detect people, an obstacle, and so on present ahead of the mobile robot 20 in its moving direction by analyzing the images from the cameras 25. In a case where people, an obstacle, and so on are present ahead of the mobile robot 20 in its advancing direction, the mobile robot 20 moves along a route while the mobile robot 20 avoids them. Further, the image data from the cameras 25 is transmitted to the superior management apparatus 10.

The mobile robot 20 analyzes the image data output from the cameras 25 or detection signals output from the front-rear range sensors 241 and the right-left range sensors 242, so that the mobile robot 20 recognizes a neighboring object or identifies its own position. The cameras 25 capture images ahead of the mobile robot 20 in its advancing direction. As illustrated herein, the mobile robot 20 assumes a side where the cameras 25 are provided as the front side from the mobile robot 20. That is, at the time of normal movement, the front side from the mobile robot 20 is the advancing direction as indicated by an arrow.

Main Feature of Present Embodiment

Next will be described a main feature of the present embodiment in the conveyance system 1 configured as described above. The present embodiment has a main feature in an operation restriction on the mobile robot 20 when a blockade request event occurs, and a reboot of the mobile robot 20 after the operation restriction.

As described above, the conveyance system 1 according to the present embodiment is a system in which the facility management system 30 configured to manage a facility, and the mobile robots 20 configured to autonomously move inside the facility are managed. The conveyance system 1 can be also referred to as a supervisory management system.

When a blockade request event occurs in at least one area inside the facility, the facility management system 30 in the conveyance system 1 transmits, to the superior management apparatus 10, occurrence information indicating that the blockade request event occurs. The superior management apparatus 10 that has received the occurrence information automatically restricts operations of the mobile robots 20 as controlled objects. The restriction can be performed such that the superior management apparatus 10 transmits an instruction for the restriction (a restriction instruction) to the mobile robots 20, and the mobile robots 20 that have received the instruction executes an operation restriction. Note that the following description deals with an example in which the control is performed mainly by the superior management apparatus 10. However, as described above, the mobile robots 20 may directly receive the occurrence information, and the mobile robots 20 may automatically execute an operation restriction.

Here, the case where a blockade request event occurs can indicate a case where a situation in which a blockade request is issued occurs, e.g., a case where an emergency call in each color such as a code blue occurs, a case where an earthquake immediate report is received, a case where a disaster actually occurs (in cooperation with a fire detector or the like), and other cases.

Further, in a case where a predetermined condition on the blockade request event is established after the restriction is performed, the superior management apparatus 10 reboots the mobile robots 20. A typical example of the predetermined condition is a case where a predetermined period of time has passed from the occurrence of the blockade request event. Other examples of the predetermined condition include a case where the superior management apparatus 10 receives cancellation information corresponding to the occurrence information from the facility management system 30, for example. In a case where this example is employed, the facility management system 30 should be configured such that the request transmission processing portion 312 transmits cancellation information via the communication portion 34 when the blockade request determination portion 311 determines that the blockade request becomes unnecessary.

As such, in a case where the predetermined condition is established after the restriction is performed, the superior management apparatus 10 can control the mobile robot 20 such that the mobile robot 20 is rebooted by a remote control. Of course, this reboot is automatically instructed to the mobile robot 20, and the mobile robot 20 executes a reboot in response to the instruction. When the mobile robot 20 executes a reboot, the mobile robot 20 can execute an initial process necessary for start-up, so that the mobile robot 20 is returned to an original state (a normal state) from a state where its operation is restricted. The initial process may include a process of requesting a route or the like to the superior management apparatus 10 again. However, when information necessary for start-up is backed up in the storage portion 22 of the mobile robot 20 before the reboot, the process of requesting a route or the like is not required at the time of the reboot.

Note that an example in which the control is not performed mainly by the superior management apparatus 10 unlike the above description can be also employed. For example, the mobile robot 20 may be configured to receive the cancellation information corresponding to the occurrence information from the facility management system 30, and when the mobile robot 20 receives the cancellation information, the mobile robot 20 may execute a reboot. Note that a configuration that the mobile robot 20 can be rebooted by a remote operation by a manager or the like after the restriction is performed is also addable to the mobile robot 20. In this case, the mobile robot 20 can be rebooted by two ways.

With the above configuration, in a case where a blockade request event such as an earthquake or a fire occurs in at least one area inside the facility, the conveyance system 1 restricts the operation of the mobile robot 20, thereby making it possible to prevent a hazardous situation in which the mobile robot 20 keeps moving. Further, in a case where a predetermined condition is established, e.g., in a case where an influence of the blockade request event such as an earthquake or a fire is small or is reduced, the conveyance system 1 reboots the mobile robot 20, thereby making it possible to cause the mobile robot 20 to operate continuously after that.

As such, in a case where a blockade request event occurs and the operation of a mobile robot conveying a conveyance object is restricted, the conveyance system 1 can immediately restart the conveyance of the conveyance object in response to cancellation of the event.

Further, the aforementioned operation restriction may include a restriction to uniformly stop (that is, urgently stop) movements of the mobile robots 20 as controlled objects (targets to be managed). Hereby, in a case where a blockade request event occurs in the facility, it is possible to stop all the mobile robots 20, thereby allowing people to move safely in the facility.

Further, in terms of the back-up described above, in a case where the mobile robot 20 receives a restriction instruction, the mobile robot 20 may execute an operation restriction (e.g., a movement stop) after the mobile robot 20 notifies information to an external device communicable with the mobile robot 20 (the superior management apparatus 10 or its adjacent mobile robot 20). The information should be defined in advance as minimum information that should be saved. The mobile robot 20 should acquire the information from the external device when the restriction is cancelled by a reboot. Hereby, the mobile robot 20 can acquire or check necessary information before the reboot after the mobile robot 20 is rebooted. Hereby, after the mobile robot 20 is rebooted, the mobile robot 20 can more surely execute the operation continued before the operation restriction (or right before the reboot is executed after the operation restriction).

Further, at the time of the notification to the external device, it is preferable to also notify the external device that a restriction has been performed under a special circumstance (under a circumstance where a blockade request event has occurred). Further, the notification to the external device may be executed only in a case where a specific conveyance object is conveyed, e.g., in a case where a restriction is performed in a state where the mobile robot 20 carries medicines.

Conveyance Method

Figure 5:
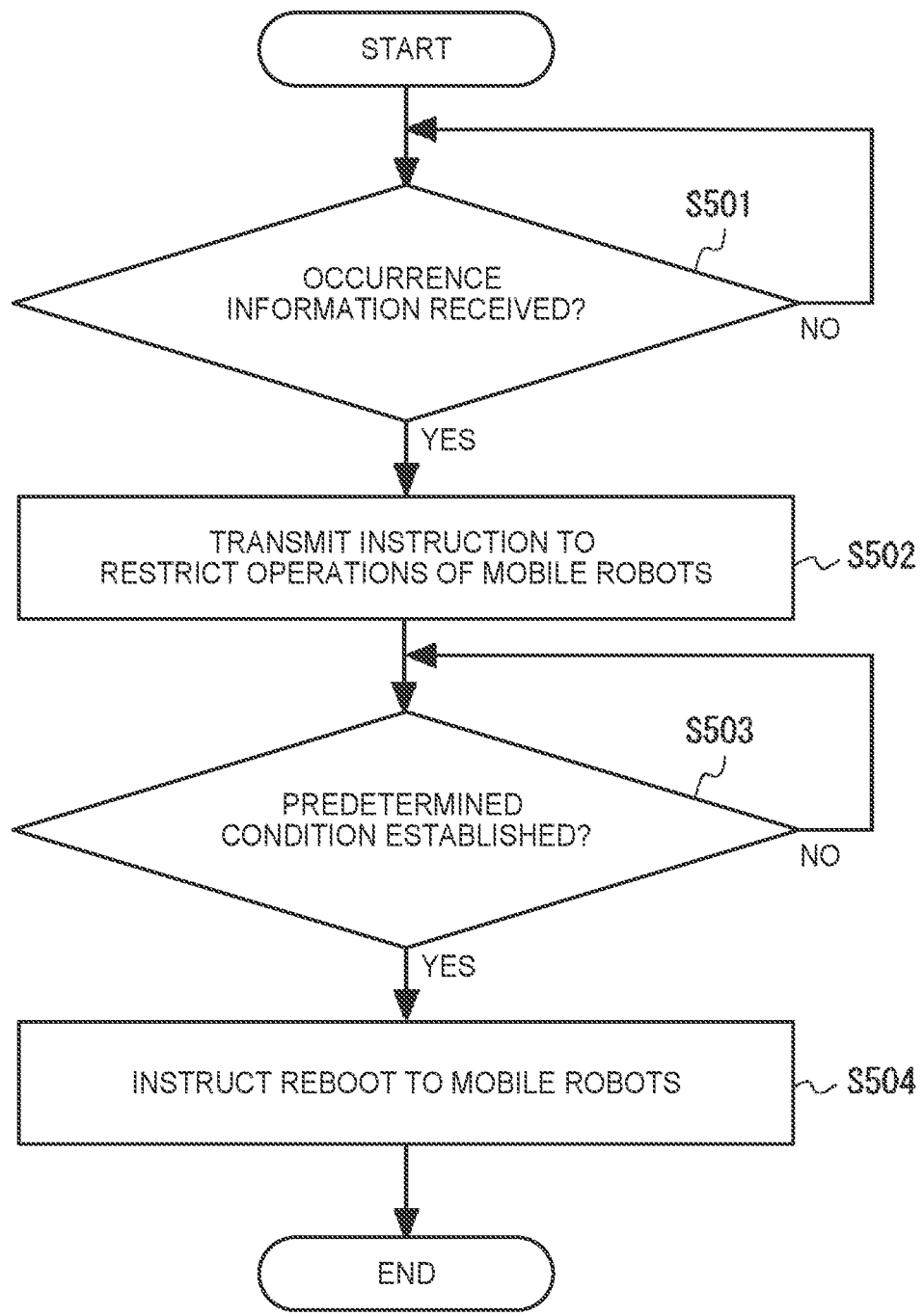
FIG. 5 is a flowchart illustrating an example of a conveyance method according to the present embodiment.

An example of a conveyance method (a conveyance process) in the conveyance system 1 will be described with reference to FIG. 5. FIG. 5 is a flowchart illustrating the conveyance method according to the present embodiment.

First, the superior management apparatus 10 determines whether or not the superior management apparatus 10 has received occurrence information from the facility management system 30 (S501). At a stage where a determination of YES is made in step S501, the superior management apparatus 10 automatically transmits, to the mobile robots 20 as controlled objects, a restriction instruction to restrict operations of the mobile robots 20 (S502). The mobile robots 20 receiving the restriction instruction execute an operation restriction.

Subsequently, the superior management apparatus 10 determines whether or not the predetermined condition is established (S503). At a stage where a determination of YES is made in step S503, the superior management apparatus 10 instructs a reboot to the mobile robots 20 (S504) and ends the process. In response to step S504, the mobile robots 20 are rebooted, so that the mobile robots 20 execute operations continued before the operation restriction (or right before the reboot is executed after the operation restriction). The process described in FIG. 5 can be executed every time the superior management apparatus 10 receives occurrence information.

Modified Process Example 1

Figure 6:
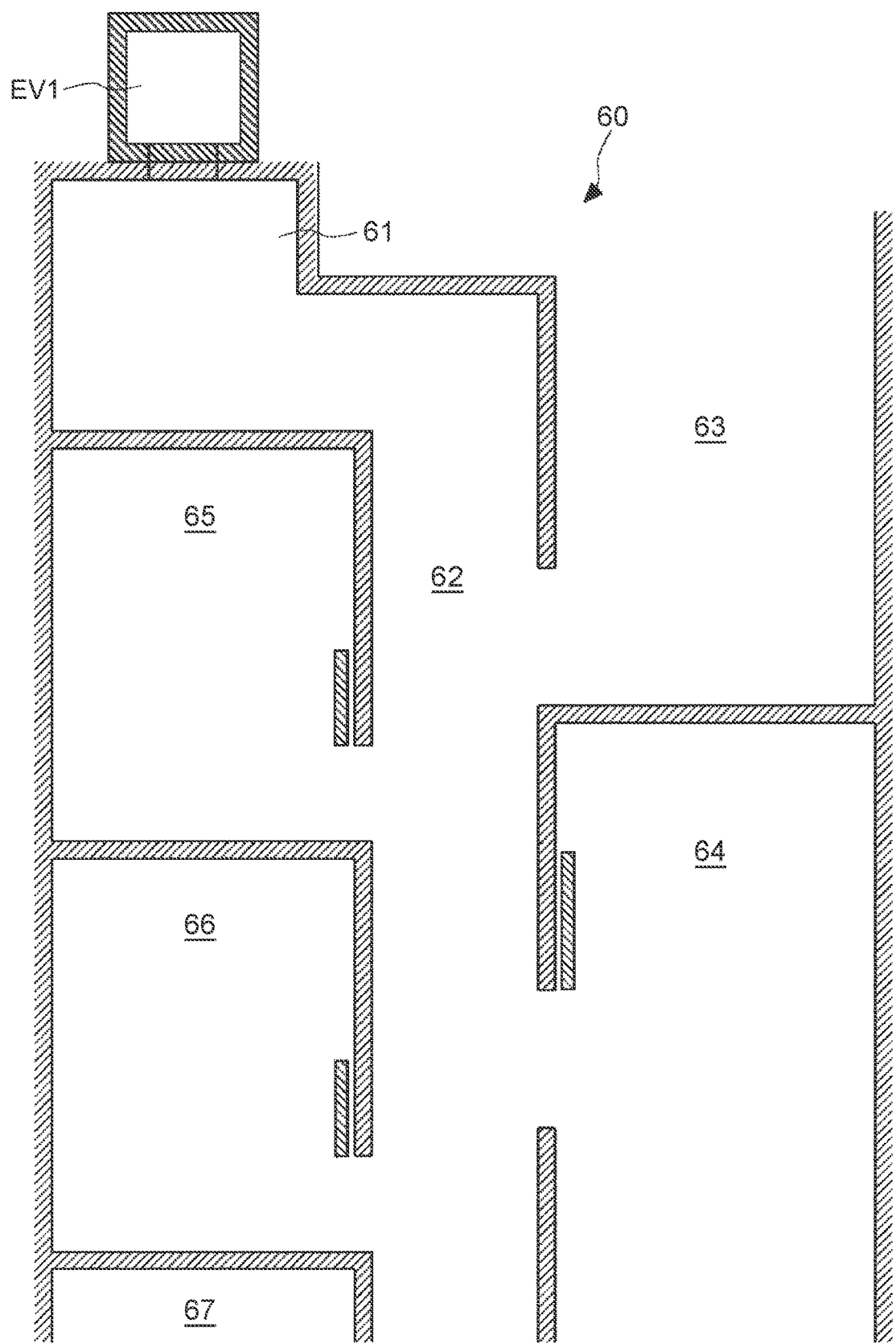
FIG. 6 is a schematic view illustrating an example of a management area to be managed by the facility management system in FIG. 1.

The operations of the mobile robots 20 may be restricted in a particular area. Such an example will be described with reference to FIG. 6. FIG. 6 is a schematic view illustrating an example of a management area to be managed by the facility management system 30 in FIG. 1.

In the example illustrated in FIG. 6, a management area 60 set in the facility where the autonomous mobile robots 20 are operated is illustrated. The management area 60 includes an elevator hall 61, a corridor 62 connected to the elevator hall 61, a nurse station 63 placed on either side of the corridor 62, and rooms (sickrooms) 64 to 67.

For example, the restriction on the operations of the mobile robots 20 targeted for management may include a restriction to uniformly prohibit the mobile robots 20 from entering a particular area. For example, as the particular area, one or more areas such as the elevator hall 61 and the corridor 62 can be set in advance.

Hereby, in a case where a blockade request event occurs in the facility, the particular area can be secured, so that the particular area can be used variously. As a process to be performed in a case where the restriction includes a restriction to uniformly stop the mobile robots 20 and a restriction to uniformly prohibit the mobile robots 20 from entering the particular area, the following process may be performed.

That is, when a given mobile robot 20 enters the particular area, the given mobile robot 20 is controlled such that the given mobile robot 20 gets out of the particular area and stops outside the particular area.

Further, in a case where the facility is a hospital illustrated in FIG. 6 and in a case where a blockade request event is an emergency-call receiving event (that is, in a case where a blockade request event is determined to occur when an emergency call is issued), the particular area may be an area where a blockade request is made in response to the emergency call thus issued. Hereby, in a case where an emergency call is issued in the hospital, a particular area to be used at the time when an emergency call is issued can be secured.

Modified Process Example 2

Figure 7:
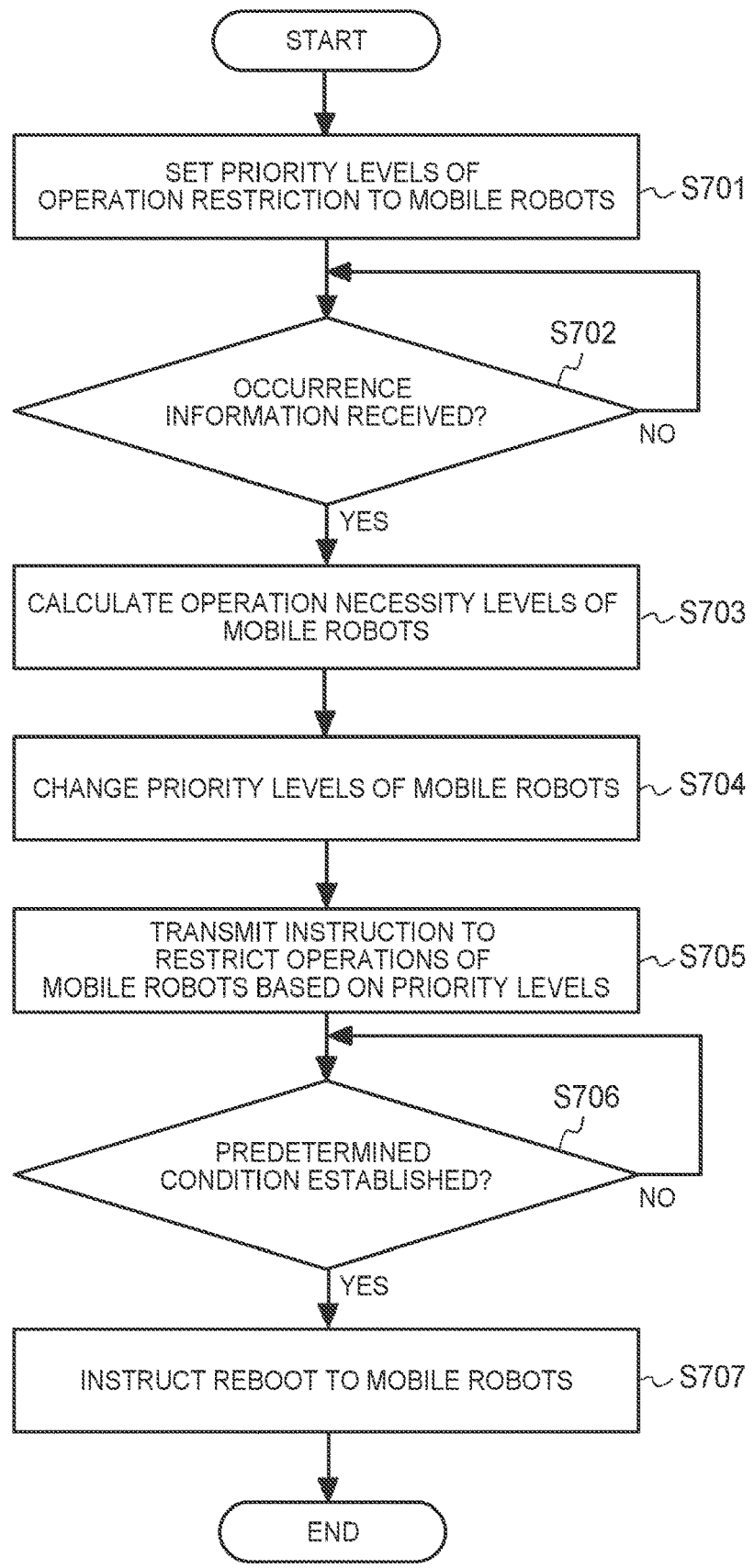
FIG. 7 is a flowchart illustrating another example of the conveyance method according to the present embodiment.

Subsequently, FIG. 7 is a flowchart illustrating another example of the conveyance method according to the present embodiment. Further, FIG. 8 is a view illustrating a setting example of priority levels of mobile robots used in the example of FIG. 7, and FIG. 9 is a view illustrating an example of changing of the priority levels in accordance with operation necessity levels used in the example of FIG. 7.

First, the superior management apparatus 10 sets priority levels in an operation restriction for the mobile robots 20 as controlled objects, and the priority levels are stored in the storage portion 12 as part of the robot information 123 or the like, for example (S701). A timing to set the priority levels is not limited in particular, but the priority levels should be set before receipt of occurrence information serving as a trigger to execution of an operation restriction in the present embodiment. The priority levels are values indicative of priorities for the mobile robots 20 as controlled objects to execute the operation restriction. For example, as illustrated in FIG. 8, the priority levels can be set to values from 1 to 10 in association with mobile robot IDS. Note that, in this example, a priority level "1" is set as a minimum value, and a priority level "10" is set as a maximum value. However, the priority levels are not limited to them.

The superior management apparatus 10 determines whether or not the superior management apparatus 10 has receive occurrence information from the facility management system 30 (S702), similarly to step S501 in FIG. 5. At a stage where a determination of YES is made in step S702, the superior management apparatus 10 calculates respective operation necessity levels for the mobile robots 20 (S703).

Here, the operation necessity level is a degree indicative of the necessity to operate the mobile robot 20 as a target. The operation necessity level can indicate a survival degree of the mobile robot 20 such as an importance level of a conveyance object conveyed by the mobile robot 20 or a battery capacity (whether or not the mobile robot 20 can reach a charging station (not illustrated)), for example. The operation necessity level can be increased as the importance level of the conveyance object is higher, and the operation necessity level can be increased as it is more difficult for the mobile robot 20 to reach the charging station (as it takes more time for the mobile robot 20 to reach the charging station).

The superior management apparatus 10 receives and stores information indicative of a battery capacity from the mobile robot 20 at the time of making a conveyance instruction, and when a determination of YES is made in step S702, the superior management apparatus 10 can estimate the operation necessity level of the mobile robot 20 based on the battery capacity, a conveyance route, and so on. Of course, at the time when a determination of YES is made in step S702, the superior management apparatus 10 may request, to the mobile robot 20, information indicative of the battery capacity and acquire the information.

Subsequently, the superior management apparatus 10 changes the priority levels of the mobile robots 20 in accordance with the calculated operation necessity levels so that exchange of information by use of robot-to-robot communication is performed prior to an operation restriction (S704). As described above, the robot-to-robot communication can be performed by use of short-distance wireless communication such as BLUETOOTH (registered trademark), for example, and the information to be exchanged via the communication can be position information on the mobile robots 20. By securing such information, the mobile robots 20 can acquire the information at the time when the mobile robots 20 are rebooted after that, or the superior management apparatus 10 can acquire the information.

The change in step S704 can be performed such that the values of the priority levels are increased or decreased in accordance with the operation necessity levels (herein, 1 to 5) by use of priority level change values illustrated in FIG. 9, for example. Hereby, for example, in a case where a mobile robot ID "R1" has an operation necessity level of "5," and a mobile robot ID "R4" has an operation necessity level of "1," the priority level of the mobile robot ID "R1" is changed from "10" to "8," and the priority level of the mobile robot ID "R4" is changed from "7" to "9." Hereby, in a state before the priority levels are changed, the operation restriction on the mobile robot ID "R1" is executed prior to the operation restriction on the mobile robot ID "R4," but in a state after the priority levels are changed, the operation restriction on the mobile robot ID "R4" is executed prior to the operation restriction on the mobile robot ID "R1" in step S705 (described later).

Subsequently to step S704, the superior management apparatus 10 automatically transmits, to the mobile robots 20 as controlled targets, restriction instructions to restrict the operations of the mobile robots 20 at respective process timings based on the priority levels of the mobile robots 20 (in the above example, as the priority level of the mobile robot 20 is higher, the restriction instruction is transmitted to the mobile robot 20 at an earlier timing) (S705). The mobile robots 20 restrict their operations sequentially (at respective timings corresponding to the above timings) upon receipt of the restriction instructions.

Further, the restriction instructions in S705 can be instructions to cause the mobile robots 20 to restrict their operations after the mobile robots 20 perform robot-to-robot communication. However, basically, in a case where the robot-to-robot communication is set to be performed at regular intervals, the mobile robots 20 have enough time to make communication with each other before the restriction instructions are transmitted, and therefore, it is not necessary to instruct the mobile robots 20 to make communication with each other before execution of the operation restriction.

Subsequently, similarly to steps S503, S504 in FIG. 5, the superior management apparatus 10 determines whether or not the predetermined condition is established (S706). At a stage where a determination of YES is made in step S706, the superior management apparatus 10 instructs a reboot to the mobile robots 20 (S707) and ends the process. In response to step S707, the mobile robots 20 are rebooted, so that the mobile robots 20 execute operations continued before the operation restriction (or just before the reboot is executed after the operation restriction). The process described in FIG. 7 can be executed every time the superior management apparatus 10 receives occurrence information.

Further, the timings of the instructions in step S707 can be also determined based on the priority levels. More specifically, as the mobile robot 20 has a higher priority level for restriction, a lower reboot priority level may be given to the mobile robot 20, and the mobile robot 20 may be rebooted earlier.

With such a process, in a case where a blockade request event occurs in the facility, the mobile robot 20 that needs to be operated can secure necessary information in priority to other mobile robots 20.

Modified Process Example 3

Further, in a case where the mobile robot 20 receives a restriction instruction during execution of a task, the mobile robot 20 may determine, based on a remaining task necessary to accomplish the task in process, whether or not the mobile robot 20 completes the remaining task before execution of a restriction corresponding to the restriction instruction, and the mobile robot 20 may execute the restriction at a timing based on the determination. Here, the remaining task can be roughly regarded as a work load of the remaining task and include, for example, a remaining travel distance, a remaining travel distance included in the course of a currently remaining conveyance task, operations (whether or not the mobile robot 20 should pass through an elevator, etc.), a type of the task, and so on.

Hereby, in a case where a blockade request event occurs in the facility, each mobile robot can execute an operation restriction in accordance with a remaining task. That is, the mobile robot 20 during execution of a task does not stop immediately depending on a remaining task necessary to accomplish the task in process, and the mobile robot 20 can determine whether the mobile robot 20 completes the remaining task or not, and then execute a restriction based on the determination.

Further, the above determination can be made based on the battery capacity of the mobile robot 20. As the battery capacity is larger, the execution of the restriction may be delayed so that the remaining task is executed, or the execution of the restriction may be advanced.

For example, in terms of the mobile robots 20 conveying respective conveyance objects having higher priority levels, a mobile robot 20 with a battery capacity by which its task is barely achievable can be determined not to stop immediately so that the mobile robot 20 can complete the task, while other mobile robots 20 can be determined to uniformly stop in accordance with restriction instructions. In a case where such a determination is made, the mobile robot 20 that is not stopped immediately should preferentially transmit information or an instruction by robot-to-robot communication. Even in a case where a counterpart mobile robot 20 in the robot-to-robot communication is determined to uniformly stop with the other mobile robots 20, when the counterpart mobile robot 20 receives a communication request from another mobile robot 20, the counterpart mobile robot 20 may put a priority on the communication and may not stop immediately.

Further, various determinations described above can be made by the superior management apparatus 10. In this case, the superior management apparatus 10 can change timings to make restriction instructions to the mobile robots 20, so that the mobile robots 20 can restrict their operations after completion of their remaining tasks.

Modified Process Example 4

Further, as an operation restriction on the mobile robot 20, the superior management apparatus 10 may restrict the mobile robot 20 such that the mobile robot 20 abandons a conveyance task in process and returns to a standby place.

This restriction corresponds to a restriction to temporarily change the destination to the standby place. Further, the superior management apparatus 10 can be configured to return the mobile robot 20 to the standby place only in a case where the number of people included in video image acquired from the environment camera 300 is not equal to or more than a given number (in a case where there are no people in the office or the like). In this case, at the time of rebooting the mobile robot 20, the mobile robot 20 should be set to restart the conveyance task executed before the restriction from the standby place.

Modified Process Example 5

Further, captured image data or sound recording data in the facility can be acquired by the environment camera 300, and they can be used in a case where the mobile robot 20 execute an operation restriction in other methods different from Process Example 4. More specifically, the superior management apparatus 10 determines a panic degree in the facility based on at least either one of the captured image data and the sound recording data acquired in the facility. Any criteria can be employed for the determination, but the superior management apparatus 10 can make a determination from a learning model obtained by machine learning, for example.

Then, the superior management apparatus 10 may determine a mobile robot 20 to be restricted from among the mobile robots 20 as controlled objects in accordance with the determined panic degree. Hereby, in a case where a blockade request event occurs in the facility, the superior management apparatus 10 can individually cause each of the mobile robots 20 to execute an operation restriction in accordance with the panic degree in the facility.

Others

Further, some of or all of the processes in the superior management apparatus 10, the mobile robot 20, the facility management system 30, and so on can be implemented as a computer program. Such a program can be stored by use of various types of non-transitory computer readable media and supplied to a computer. The non-transitory computer readable media include various types of tangible storage media. Examples of the non-transitory computer readable media include magnetic recording media (e.g., a flexible disk, a magnetic tape, a hard disk drive), optical magnetic recording media (e.g., a magneto-optical disk), a CD read-only memory (CD-ROM), a CD-R, a CD-R/W, a semiconductor memory (e.g., a mask ROM, a programmable ROM (PROM)), an erasable PROM (EPROM), a flash ROM, and a random access memory (RAM). Further, the program may be supplied to a computer by various types of transitory computer readable media. Examples of the transitory computer readable media include an electrical signal, an optical signal, and an electromagnetic wave. The transitory computer readable media can supply the program to the computer via a wired communication channel such as an electric wire or an optical fiber, or a wireless communication channel.

Note that the present disclosure is not limited to the above embodiments, and various modifications can be made within a range that does not deviate from the gist of the disclosure.

For example, the above embodiment deals with various examples related to an operation restriction on a mobile robot. However, these examples can be also applied to a system in which the mobile robot is not rebooted in a case where a predetermined condition is established.

Further, the above embodiment deals with the system in which a mobile robot autonomously moves inside a hospital. However, the conveyance system can also achieve conveyance of a conveyance object in a hotel, a restaurant, an office building, an event site a complex facility, and the like. Further, the above embodiment has been described on the premise that the mobile robot conveys a conveyance object in one facility. However, in a case where the mobile robot is a mobile robot movable between a plurality of facilities, the conveyance system is also applicable to conveyance between the facilities. Further, the conveyance system according to the present embodiment is not limited to a case where the mobile robot 20 configured as described above is used, and instead of this or in addition to this, mobile robots having various configurations can be used.

What is claimed is:

1. A conveyance system in which medical equipment is conveyed by use of a plurality of mobile robots autonomously movable inside a medical welfare facility, wherein:
   in a case where an emergency call event or a disaster event occurs in at least one area inside the medical welfare facility, the conveyance system receives occurrence information transmitted from a facility management system configured to manage the medical welfare facility and causes the mobile robots to execute an operation restriction to restrict operations of the mobile robots; and
   in a case where a predetermined condition for the emergency call event or the disaster event is established after the mobile robots execute the operation restriction, the conveyance system reboots the mobile robots;
   wherein:
   the predetermined condition comprises a predetermined period of time having passed from the emergency call event or the disaster event;
   priority levels indicative of priorities to execute the operation restriction are set to the mobile robots; and
   the priority levels of the mobile robots are changed in accordance with operation necessity levels indicative of necessities to operate the mobile robots so that exchange of information by use of communication between the mobile robots is performed prior to the operation restriction.

2. The conveyance system according to claim 1, wherein:
   in a case where the mobile robots receive a restriction instruction, the mobile robots notify information to an external device communicable with the mobile robots and then execute the operation restriction; and
   in a case where the operation restriction is cancelled by rebooting the mobile robots, the mobile robots acquire the information from the external device.

3. The conveyance system according to claim 1, wherein the operation restriction executed by the mobile robots includes a restriction to uniformly prohibit movements of the mobile robots.

4. The conveyance system according to claim 1, wherein the operation restriction executed by the mobile robots includes a restriction to uniformly prohibit the mobile robots from entering a particular area.

5. The conveyance system according to claim 4, wherein, in a case where the medical welfare facility is a hospital and the emergency call event or the disaster event is an event of receiving an emergency call, the particular area is an area where a blockade request is made in response to the emergency call thus received.

6. The conveyance system according to claim 1, wherein:
   in a case where the mobile robots receive a restriction instruction during execution of respective tasks, the mobile robots determine, based on respective remaining tasks necessary to accomplish the respective tasks, whether or not the mobile robots complete the respective remaining tasks before execution of a restriction corresponding to the restriction instruction; and
the mobile robots execute the restriction at respective timings based on respective determination results.

7. The conveyance system according to claim 1, wherein:
the conveyance system determines a panic degree inside the medical welfare facility based on at least one of captured image data and sound recording data acquired inside the medical welfare facility; and
the conveyance system determines a mobile robot to be restricted from among the mobile robots in accordance with the panic degree.

8. A conveyance method for conveying medical equipment by use of a plurality of mobile robots autonomously movable inside a medical welfare facility, the conveyance method comprising:
in a case where an emergency call event or a disaster event occurs in at least one area inside the medical welfare facility, receiving occurrence information transmitted from a facility management system configured to manage the medical welfare facility and causing the mobile robots to execute an operation restriction to restrict operations of the mobile robots; and
in a case where a predetermined condition for the emergency call event or the disaster event is established after the mobile robots execute the operation restriction, rebooting the mobile robots;
setting priority, to the mobile robots, levels indicative of priorities to execute the operation restriction; and
changing the priority levels of the mobile robots in accordance with operation necessity levels indicative of necessities to operate the mobile robots so that exchange of information by use of communication between the mobile robots is performed prior to the operation restriction;
wherein the predetermined condition comprises a predetermined period of time having passed from the emergency call event or the disaster event.

9. The conveyance method according to claim 8, comprising:
in a case where the mobile robots receive a restriction instruction, causing the mobile robots to notify information to an external device communicable with the mobile robots and then execute the operation restriction; and
in a case where the operation restriction is cancelled by rebooting the mobile robots, causing the mobile robots to acquire the information from the external device.

10. The conveyance method according to claim 8, wherein the operation restriction executed by the mobile robots includes a restriction to uniformly prohibit movements of the mobile robots.

11. The conveyance method according to claim 8, wherein the operation restriction executed by the mobile robots includes a restriction to uniformly prohibit the mobile robots from entering a particular area.

12. The conveyance method according to claim 11, wherein, in a case where the medical welfare facility is a hospital and the emergency call event or the disaster event is an event of receiving an emergency call, the particular area is an area where a blockade request is made in response to the emergency call thus received.

13. The conveyance method according to claim 8, comprising:
in a case where the mobile robots receive a restriction instruction during execution of respective tasks, causing the mobile robots to determine, based on respective remaining tasks necessary to accomplish the respective tasks, whether or not the mobile robots complete the respective remaining tasks before execution of a restriction corresponding to the restriction instruction; and
causing the mobile robots to execute the restriction at respective timings based on respective determination results.

14. The conveyance method according to claim 8, comprising:
determining a panic degree in the medical welfare facility based on at least one of captured image data and sound recording data acquired in the medical welfare facility; and
determining a mobile robot to be restricted from among the mobile robots in accordance with the panic degree.

15. A non-transitory computer readable medium storing a program causing a computer to execute a conveyance management in which medical equipment is conveyed by use of a plurality of mobile robots autonomously movable inside a medical welfare facility, the conveyance management being performed as follows:
in a case where an emergency call event or a disaster blockade request event occurs in at least one area in the medical welfare facility, the computer receives occurrence information transmitted from a facility management system configured to manage the medical welfare facility and causes the mobile robots to execute an operation restriction to restrict operations of the mobile robots; and
in a case where a predetermined condition for the emergency call event or the disaster event is established after the mobile robots execute the operation restriction, the computer reboots the mobile robots;
wherein:
the predetermined condition comprises a predetermined period of time having passed from the emergency call event or the disaster event:
priority levels indicative of priorities to execute the operation restriction are set to the mobile robots; and
the priority levels of the mobile robots are changed in accordance with operation necessity levels indicative of necessities to operate the mobile robots so that exchange of information by use of communication between the mobile robots is performed prior to the operation restriction.

16. The computer readable medium according to claim 15, wherein:
in a case where the mobile robots receive a restriction instruction, the mobile robots notify information to an external device communicable with the mobile robots and then execute the operation restriction; and
in a case where the operation restriction is cancelled by rebooting the mobile robots, the mobile robots acquire the information from the external device.

17. The computer readable medium according to claim 15, wherein the operation restriction executed by the mobile robots includes a restriction to uniformly prohibit movements of the mobile robots.

18. The computer readable medium according to claim 15, wherein the operation restriction executed by the mobile robots includes a restriction to uniformly prohibit the mobile robots from entering a particular area.

19. The computer readable medium according to claim 18, wherein, in a case where the medical welfare facility is a hospital and the emergency call event or the disaster event is an event of receiving an emergency call, the particular area is an area where a blockade request is made in response to the emergency call thus received.

20. The computer readable medium according to claim 15, wherein:
  in a case where the mobile robots receive a restriction instruction during execution of respective tasks, the mobile robots determine, based on respective remaining tasks necessary to accomplish the respective tasks, whether or not the mobile robots complete the respective remaining tasks before execution of a restriction corresponding to the restriction instruction; and
  the mobile robots execute the restriction at respective timings based on respective determination results.

21. The computer readable medium according to claim 15, wherein:
  the computer determines a panic degree inside the medical welfare facility based on at least one of captured image data and sound recording data acquired inside the medical welfare facility; and
  the computer determines a mobile robot to be restricted from among the mobile robots in accordance with the panic degree.

* * * * *